United States Patent [19]

Hug

[11] 3,813,961
[45] June 4, 1974

[54] SAFETY STEERING ARRANGEMENTS FOR MOTOR VEHICLES

[75] Inventor: Karl Hug, Lenzhahner, Germany

[73] Assignee: General Motors Corporation, Detroit, Mich.

[22] Filed: Mar. 9, 1973

[21] Appl. No.: 339,740

[30] Foreign Application Priority Data
Mar. 16, 1972  Germany............................ 2212713

[52] U.S. Cl.................................... 74/492, 180/82
[51] Int. Cl............................................... B62d 1/18
[58] Field of Search........ 74/492, 493, 552; 180/82, 180/97; 188/1 C

[56] References Cited
UNITED STATES PATENTS
3,482,466  12/1969  Orlich et al........................... 74/492
3,621,732  11/1971  Kanivt................................... 74/492
3,675,505  7/1972   Henning................................ 74/552

Primary Examiner—Benjamin W. Wyche
Assistant Examiner—F. D. Shoemaker
Attorney, Agent, or Firm—D. L. Ellis

[57] ABSTRACT

A safety steering arrangement for a motor vehicle utilises a steering shaft, or a rectilinear portion of the steering shaft, formed with depressions which provide local alteration of the cross-sectional shape so as to form preferential yield regions for lateral buckling of the rectilinear portion, corresponding to shortening of the steering shaft, at a predetermined critical loading, corresponding to the influence of a frontal impact force on the vehicle. Thus a tube portion initially of circular cross-section may be formed with flattened portions which are spaced longitudinally from one another and are staggered circumferentially, such flattened portions providing local cross-sectional shapes which may be generally oval, or D-shaped, or flat pinch regions such that diametrically opposite wall regions of the tube contact each other, or of hour-glass configuration.

9 Claims, 21 Drawing Figures

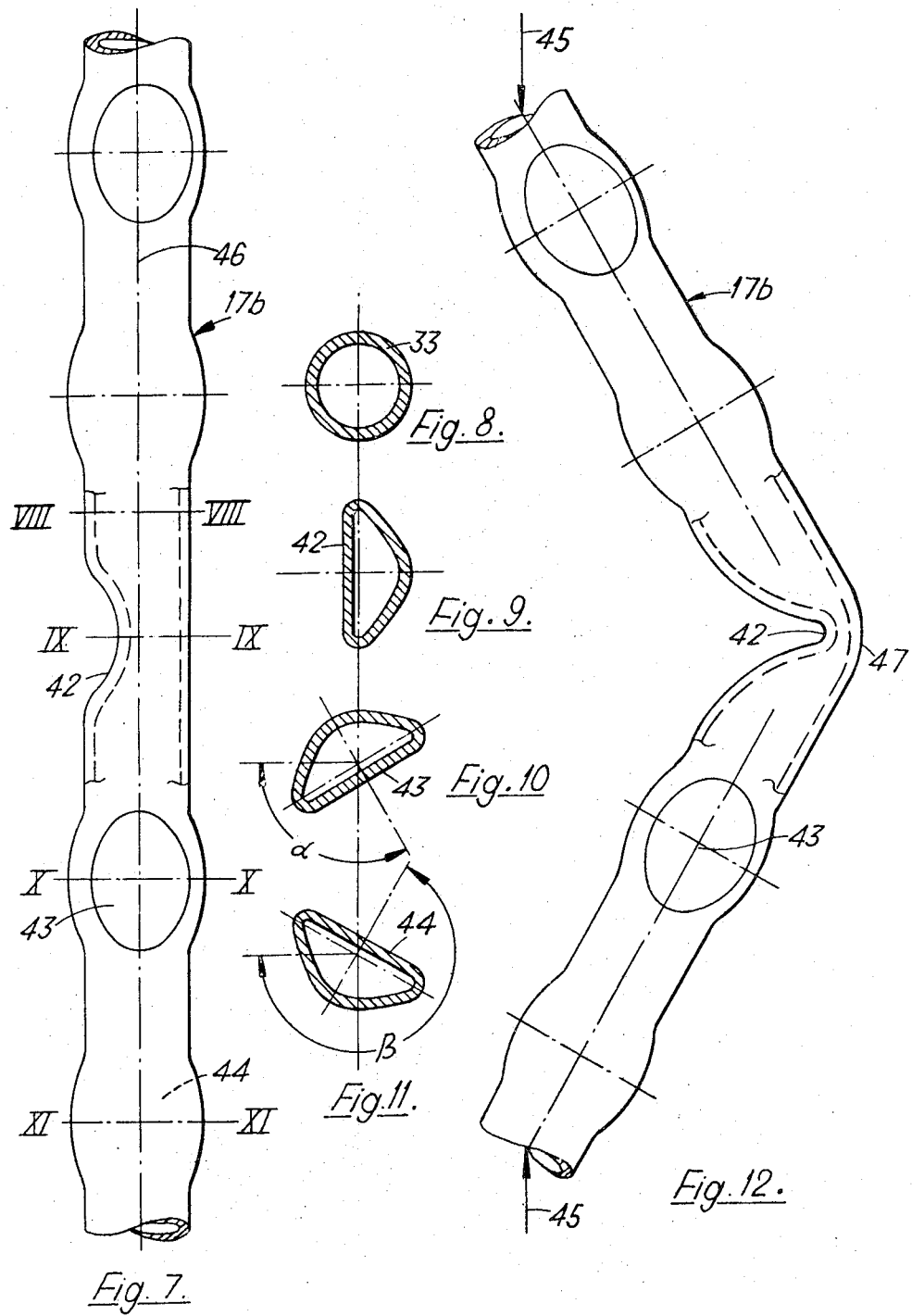

SAFETY STEERING ARRANGEMENTS FOR MOTOR VEHICLES

Embodiments are also illustrated in which one or two universal joints are included in the steering shaft between the vehicle's steering gear and an upper support bearing for the steering shaft.

This invention relates to safety steering arrangements for motor vehicles, utilising a steering shaft which, in response to a force corresponding to frontal impact of the vehicle, is permanently deformable with absorption of energy.

Safety steering arrangements have already been proposed which are intended to prevent the steering wheel from being forced into the interior space of the vehicle, for example, in the event of frontal impact of the vehicle. Such prior proposals have tended to involve rather high production costs and possibly also assembly costs, and in some cases to require a disproportionately large amount of material to ensure that the steering shaft is capable of fulfilling its normal function of transmitting the steering effort from the steering wheel. Also, in some cases the space requirement in the vehicle may be rather high.

In general terms, the present invention is concerned with the provision, with relatively low production costs, of a safety steering arrangement utilising a steering shaft which will be self-shortening (in relation to its original axial direction) with absorption of energy when subjected to a force loading corresponding to the results of frontal vehicle impact. For this purpose, a rectilinear portion of the steering shaft is formed with depressions each providing local alteration of the cross-sectional shape of the rectilinear portion, with the depressions thereby providing a plurality of preferential yield regions for lateral buckling of the rectilinear portion of the steering shaft at a predetermined critical loading.

For a steering shaft or steering shaft portion having a rectilinear steering shaft axis, unbent in its initial installed condition, a tube constitutes the most convenient and cheapest solution.

In the event of frontal vehicle impact such a tube-form steering shaft or steering shaft portion, formed with depressions as already referred to, will be deformed from its original rectilinear configuration and buckle laterally, thereby becoming shortened, only on the attainment of a certain critical loading, the so-called buckling force. This deformation collapse becomes possible due to slightly eccentric application of force, the irregularities in the shape of the tube or variations in its structure, or small deviations from the axis of symmetry. Due to the irregularities provided by the aforesaid depressions, collapse may be made possible even with quite a small buckling force, whereby the steering shaft may be made to deflect and become shorter. Thereby it can be arranged that the force tending to displace the steering wheel into the passenger space is considerably reduced as compared with the conventional uniform-surfaced steering shaft of constant cross-section.

A useful feature of the safety steering arrangement in accordance with the present invention is that the rectilinear steering shaft portion has a number of preferential yield regions providing potential buckling regions between the steering gear and an upper support bearing for the steering shaft, or between one end of the steering shaft and a universal joint, or between two universal joints. By this arrangement of several potential buckling regions along the steering shaft axis, an advantageous shortening of the steering shaft can be achieved even when, at some places, buckling of the steering shaft is prevented, as by the forward portion of the vehicle already deformed by the accident. Also, because a certain amount of deformation work is required at every region of buckling, collapse of the steering shaft at several places can convert an increased proportion of the energy of motion into deformation work.

Although basically the initial cross-section of the steering shaft portion may be of any shape, including square and elliptical (generally oval) it is preferred that a tube of circular cross-section serve as initial material for the steering shaft portion, and also that the flattened portions be spaced longitudinally and staggered circumferentially from one another, for example by equal angles. The potential buckling regions may thereby be established such that the steering shaft portion is flattened in each case on both sides at diametrically opposite places, in a "pinch"-type configuration, and has a generally oval cross-section at the flattened places.

A further possibility is for the steering shaft portion to be flattened in each case on both sides at diametrically opposite places in such a way that the oppositely disposed flattened portions are in contact with one another. If required, the contacting opposite wall regions may be held together by welding.

The above-described bilateral arrangements of the flattened portions of the original cross-section ensure that in the axial direction of the oval or flattened cross-sections the buckling strength is less than in the initial cross-section. These bilateral flattened portions may extend at equal spacings from each other, over the whole or only part of the length of the steering shaft.

Instead of bilateral flattened portions, unilaterally flattened portions of the steering shaft portion, to give a D-shaped cross-section at the flattened places, can be used to provide the potential buckling regions.

The longitudinally spaced flattened portions may be mutually staggered (in the circumferential sense) by 90° in each case, whereby in the event of frontal vehicle impact the directions of collapse of the steering shaft portion would then be correspondingly staggered at 90° from each other, so that when considered over the entire length of the steering shaft this could result in uniform deformation thereof. Alternatively the successive flattened portions could be staggered at equal angles differing from 90°: in the case of unilateral flattening, a very favourable buckling action of the steering shaft can be produced by arranging that the successive flattened portions are staggered by an angle of 120°. Unequal successive angles are also possible.

In some cases it may be possible to achieve a result not dissimilar to that arising from the use of completely separate individual flattened portions by the use of a configuration in which successive depressions are as it were interconnected, provided that the required local alteration of the cross-sectional shape of the rectilinear steering shaft portion is still achieved. For example, starting from a tube of circular cross-section, the periphery of the tube may be formed with at least one continuous helically extending indentation.

The appended claims define the scope of the invention claimed. The invention and how it can be performed are hereinafter particularly described with reference to the accompanying drawings, in which:

FIG. 7 is a fragmentary side elevation of a further embodiment of a steering shaft of a safety steering arrangement in accordance with the invention;

FIG. 8 is a cross-section of the steering shaft on the line VIII—VIII of FIG. 7;

FIG. 9 is a cross-section of the steering shaft on the line IX—IX of FIG. 7;

FIG. 10 is a cross-section of the steering shaft on the line X—X of FIG. 7;

FIG. 11 is a cross section of the steering shaft on the line XI—XI of FIG. 7;

FIG. 12 is a view similar to FIG. 7 but showing the steering shaft after lateral buckling as the result of compressive loading;

Figure 1:
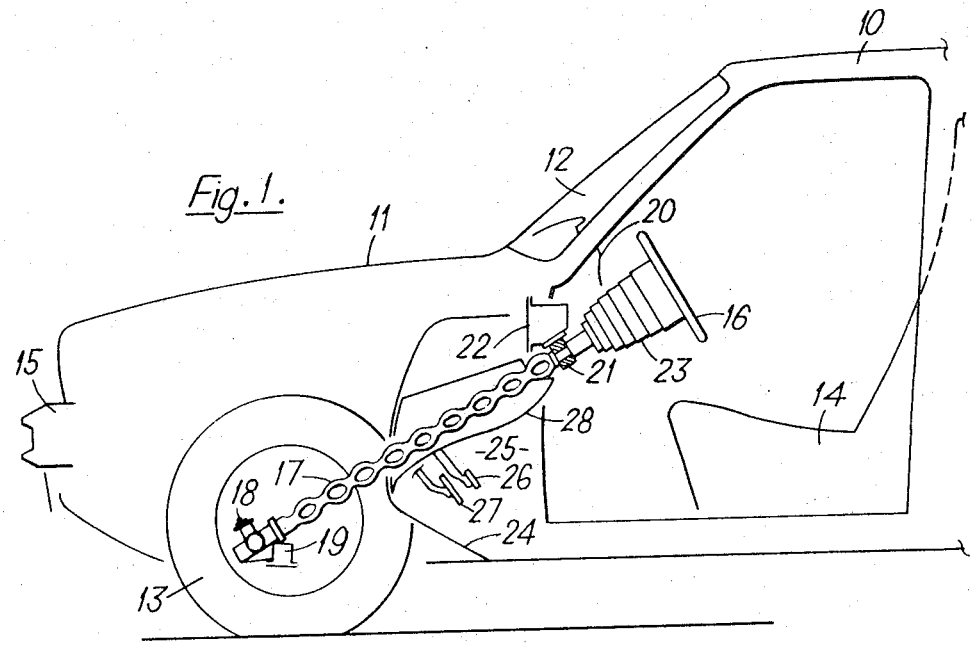
FIG. 1 is a fragmentary elevation, with parts omitted for clarity, of the front part of a motor vehicle, showing one embodiment of a safety steering arrangement in accordance with the invention mounted in the vehicle.
Figure 2:
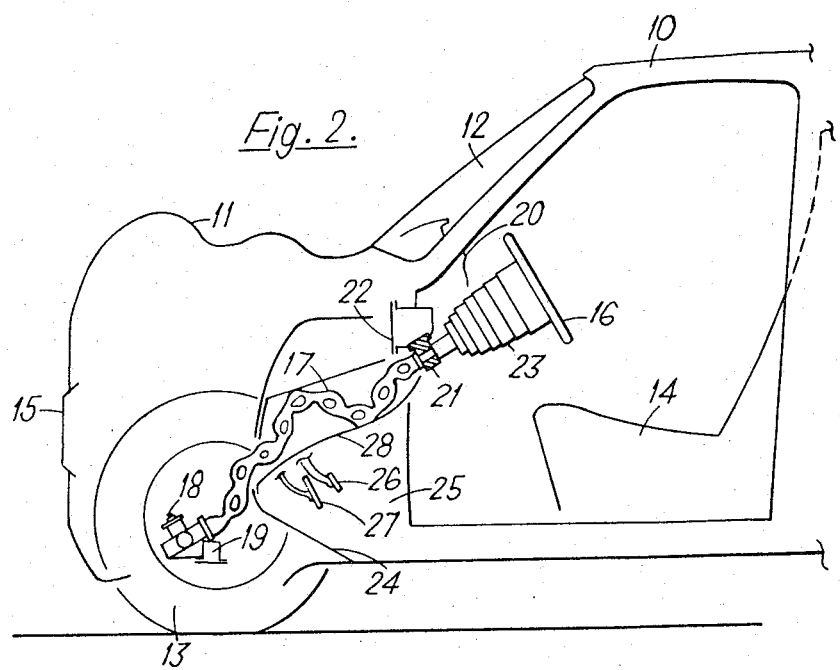
FIG. 2 is a view similar to FIG. 1 but showing the vehicle after a frontal impact.

In the drawings, in FIGS. 1 and 2 the reference numeral 10 designates a roof, 11 a forward portion of a motor vehicle including the bonnet (hood), 12 a windscreen, 13 a left-hand front wheel, 14 a driver's seat and 15 a front bumper (front fender) of the vehicle, which is a passenger car. Also shown in FIGS. 1 and 2 are a steering wheel 16, a rectilinear steering shaft 17, a steering gear 18 secured to a front frame cross-member 19, and an instrument panel 20. The steering shaft 17 is arranged to transmit steering effort from the steering wheel 16 to the steering gear 18, and is rotatably mounted in an upper support bearing 21 which is secured to a reinforcing body member 22. Between the steering wheel 16 and the upper support bearing 21 there is a deformation pot 23 which can collapse if frontal impact of the vehicle causes the driver to be thrown against the steering wheel. A clutch pedal 26 and a brake pedal 27 are disposed within a foot space 25 forwardly bounded by a fire wall 24.

FIG. 2 shows the vehicle of FIG. 1 after a frontal impact. The forward portion 11 has been deformed, and the distance between the steering gear 18 and the upper support bearing 21 has been shortened. The steering shaft 17 has buckled laterally, with reaction being provided by the upper support bearing 21 and the reinforcing body member 22. Due to its special shape, the steering shaft 17 buckles several times and asborbs a portion of the kinetic energy. The deformation pot 23 likewise receives reaction from the upper support bearing 21, and collapses to absorb energy as the driver is thrown against the steering wheel. Reference numeral 28 designates a leg-protector shield plate which prevents the steering shaft 17, as it buckles, from entering the foot space 25.

The deformation pot 23 could be replaced by other known forms of energy-absorber, for example by a break-off slider. Then, in the event of an impact on the steering wheel 16, the steering shaft would undergo lateral buckling by loading imposed from above.

Figure 4:
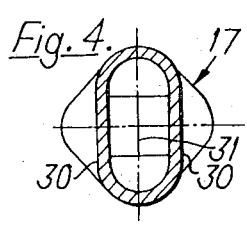
FIG. 4 is a cross-section on the line IV—IV of FIG. 3.
Figure 3:
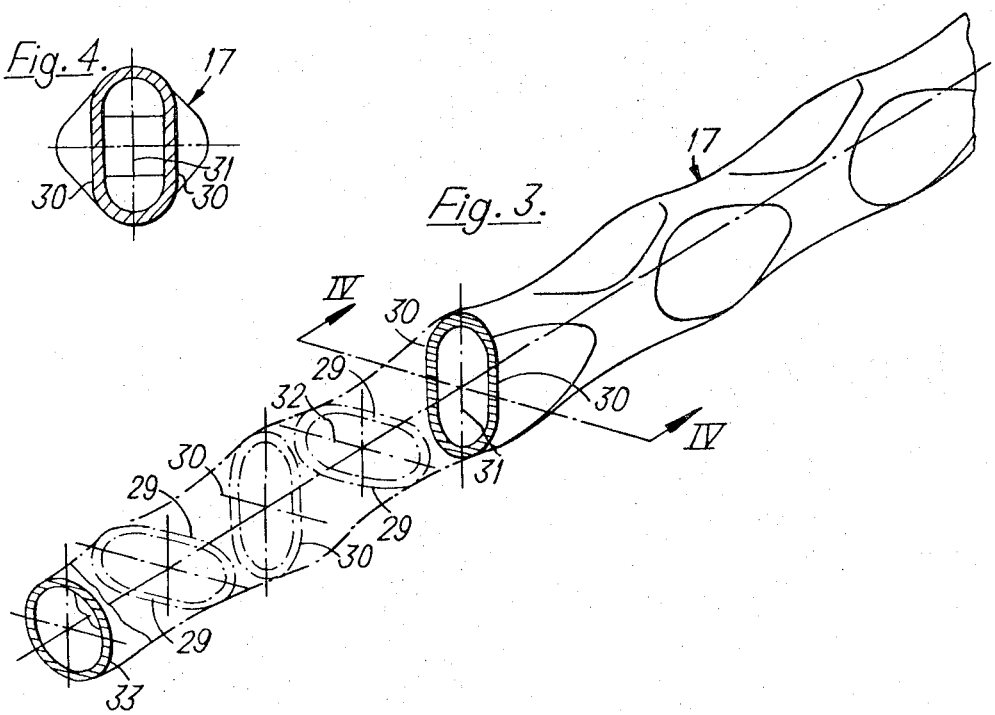
FIG. 3 is a fragmentary perspective showing details of a steering shaft of the safety steering arrangement shown in FIG. 1.

FIGS. 3 and 4 show one way in which the steering shaft 17 shown in FIGS. 1 and 2 may be shaped in detail. As FIG. 3 illustrates, the initial material is a rectilinear tubular portion of circular cross-section. At regular intervals along its entire length the tube is formed with flattened portions which are disposed at both sides of the tube at diametrically opposite places and are designated by 29 and 30 respectively. The flattened portions 29 are staggered by 90° with respect to the flattened portions 30, so that the resulting generally oval tube cross-sections are positioned with their major axes extending alternately horizontally and vertically. These bilateral flattened portions 29 and 30 ensure that the lateral-buckling strength about the major axis 31 or 32 of the oval cross-sectional shapes is less than at the original circular cross-section 33 of the steering shaft 17. Under extreme axial loading therefore, the steering shaft will buckle many times in the vertical and horizontal directions alternately, whilst absorbing impact energy.

Figure 6:
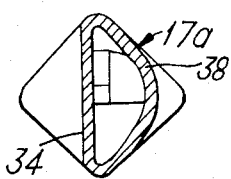
FIG. 6 is a cross-section on the line VI—VI of FIG. 5.
Figure 5:
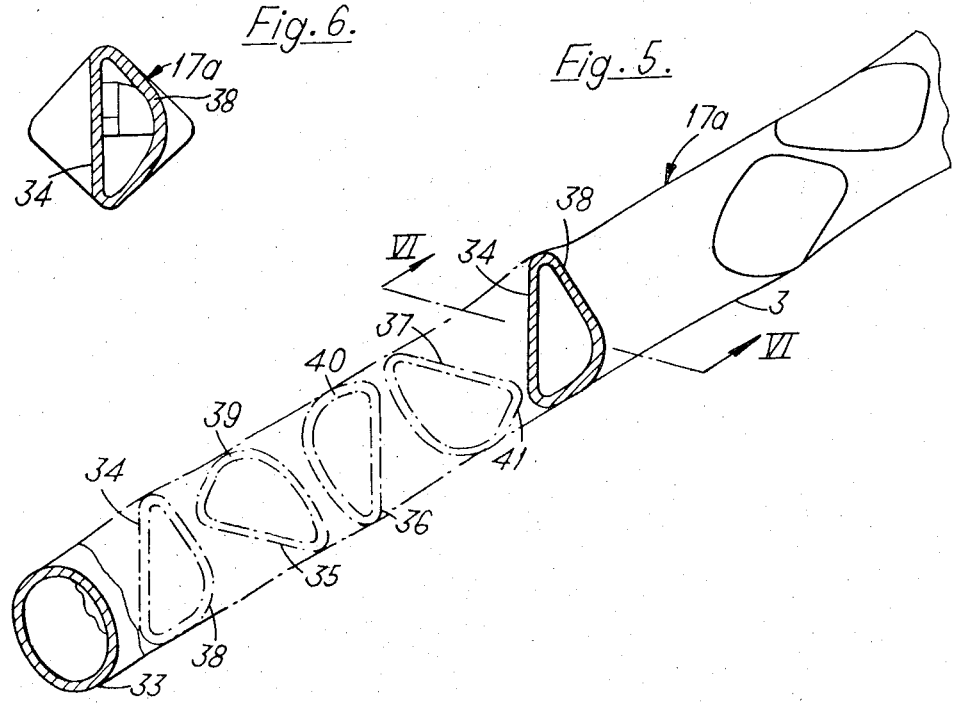
FIG. 5 is a view similar to FIG. 3, but showing another embodiment of a steering shaft of a safety steering arrangement in accordance with the invention.

In the embodiment shown in FIGS. 5 and 6, the steering shaft is denoted by 17a. Here again, the initial material is a rectilinear tube having an initial circular cross-section, corresponding to that in FIGS. 3 and 4, and designated as 33. In this case, however, the flattened portions are arranged at one side of the tube only, and are designated 34, 35, 36 and 37. At the places of the severest flattening, this results in D-shaped cross-sections 38, 39, 40 and 41 (as indicated in dash-dot lines) which lie one behind the other, seen in the direction of the longitudinal axis, and are successively turned (circumferentially staggered) by 90° due to the corresponding stagger of the flattened portions 34 to 37.

FIGS. 7 to 11 show a rectilinear steering shaft tube portion 17b similar to that in FIGS. 5 and 6. Here, however, the unilateral flattened portions 42, 43 and 44 are successively staggered by 120°. The resulting cross-sectional shapes are shown in FIGS. 8 to 11.

Instead of the flattened portions 42, 43 and 44 being circumferentially displaced from each other by 120°, they could be staggered by a different constant angular amount, or the amount of stagger could vary from portion to portion.

FIG. 12 shows the steering shaft tube portion of FIG. 7 after collapse as a consequence of compressive loading by forces 45. The weakest cross-section, which is the first to buckle, is here assumed to be at the section line IX—IX of FIG. 7. The above-mentioned irregularity of shape, and therefore the rapid collapse at a low buckling-inducing force, will be particularly clear from FIG. 7. At the section line IX—IX, for example, the compressive force acting at the centre axis 46 of the tube portion encounters a cross-sectional area which is displaced towards the right compared with the line of action of the force. Now if it happens that, of all the flattened portions, the lowest resistance to buckling collapse is present at the section line IX—IX, the tube will deform at this region at a low buckling-inducing force, in the manner illustrated in FIG. 12. If the path of collapse is limited, say at point 47 of FIG. 12, for example by the engine block, then, due to the multiplicity of flattened portions, the steering shaft tube can easily collapse once more at another place and perform advantageous deformation work again.

Figure 13:
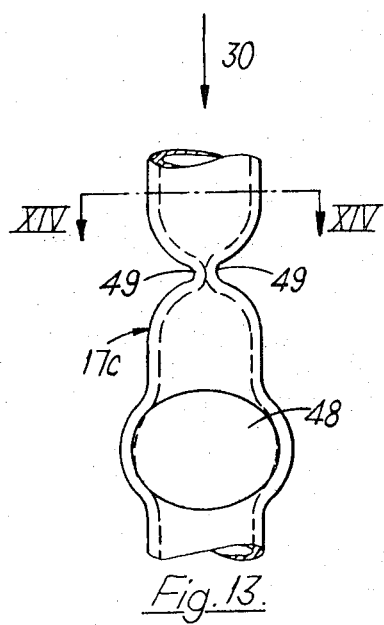
FIG. 13 is a fragmentary side elevation of a further embodiment of a steering shaft of a safety steering arrangement in accordance with the invention.

FIG. 13 shows a portion of the steering shaft tube, here designated 17c, having bilateral flattened portions 48 and 49 somewhat similar to those in FIG. 3 except that here the tube has been given maximum "pinch" compression. With the dimensions of the tube so chosen as to ensure transmission of the steering torque from the steering wheel 16 (FIG. 1), then this type of construction offers the most favourable lateral buckling capability under compressive stress. The buckling behaviour of the steering shaft 17c is then somewhat comparable to universal joints arranged one behind the other in the direction of the shaft axis. The axes of the flattened portions 50 and 51 may be sequentially staggered by an angle of 90°, as shown in FIG. 14, or alternatively by an angle differing from 90°.

Figure 15:
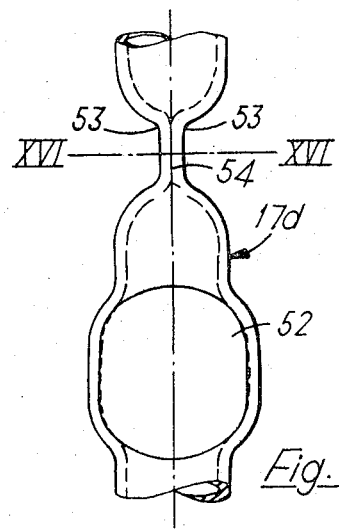
FIG. 15 is a view similar to FIG. 13 but showing a further embodiment of a steering shaft of a safety steering arrangement in accordance with the invention.
Figure 14:
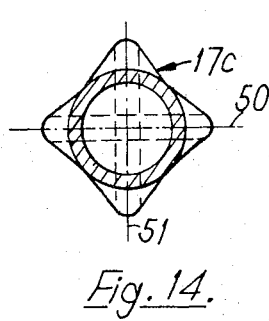
FIG. 14 is a cross-section on the line XIV—XIV of FIG. 13.

FIG. 15 shows a tube construction 17d which is rather similar to that of FIGS. 13 and 14, except that the flattened portions are so formed that they can be held together by welding at 54. The flattened tube is shown in cross-section in FIG. 16.

The flattened portions 48, 49, 52 and 53 shown in FIGS. 13 to 16, can advantageously be utilised at the end portions of the steering shaft tube 17d, with a construction as shown in FIG. 5, for example, being utilised in the central region of the tube.

Figure 16:
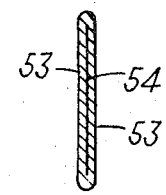
FIG. 16 is a cross-section on the line XVI—XVI of FIG. 15.
Figure 17:
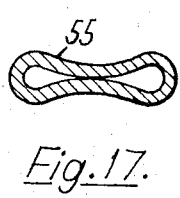
FIG. 17 illustrates a further possible cross-sectional shape at the section line XVI—XVI of FIG. 15.

FIG. 17 illustrates that the flattened portions may be shaped in a manner differing somewhat from what is shown in FIG. 16, such that the cross-sectional shape 55 is curved in an hour-glass configuration. This also holds good for the other "pinch"-type embodiments which have been described.

Figure 18:
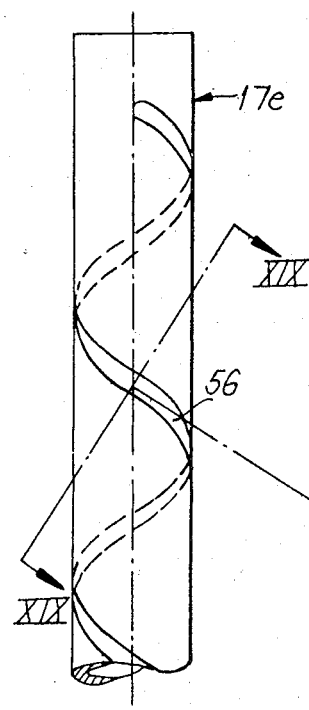
FIG. 18 is a fragmentary side elevation of a further embodiment of a steering shaft of a safety steering arrangement in accordance with the invention.
Figure 19:
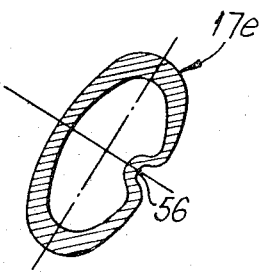
FIG. 19 is an oblique section on the line XIX—XIX of FIG. 18.

FIG. 18 illustrates a further modified embodiment showing how a steering shaft tube 17e can be provided with preferential yield regions resulting from local alterations of the cross-sectional shape. Here this is brought about by an indentation 56 which is continued in helical fashion round the periphery of the steering shaft tube 17e to form what is in effect a helically extending line of interconnected depressions.

It is not only possible for the flattened portions of the steering shaft tube, as seen in the axial direction, to be arranged at equal and/or unequal distances from each other: it is alternatively possible to combine different ones of the above cross-sectional shapes on one steering shaft tube in order to adapt the collapse of the steering shaft to the deformation behaviour of the forward portion of the vehicle.

Figure 20:
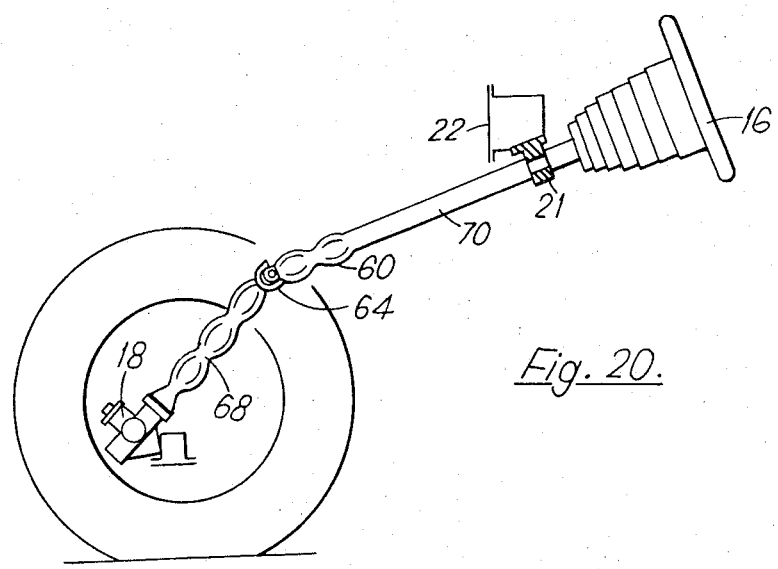
FIG. 20 is a view generally similar to FIG. 1 but illustrating an arrangement in accordance with the invention in which a steering shaft is interrupted by a universal joint.

The invention is not limited in its application to a steering shaft which is made in one piece and extends rectilinearly throughout its length. Thus FIG. 20 shows an arrangement in accordance with the invention in which a steering shaft 60 consists of two rectilinear portions 68 and 70 which are interconnected by way of a universal joint 64, the two portions 68 and 70 extending obliquely to one another. Depressions providing preferential yield regions are formed in the rectilinear portion 68 substantially over its entire length, but such depressions are formed in the rectilinear portion 70 only in the vicinity of the joint 54.

Figure 21:
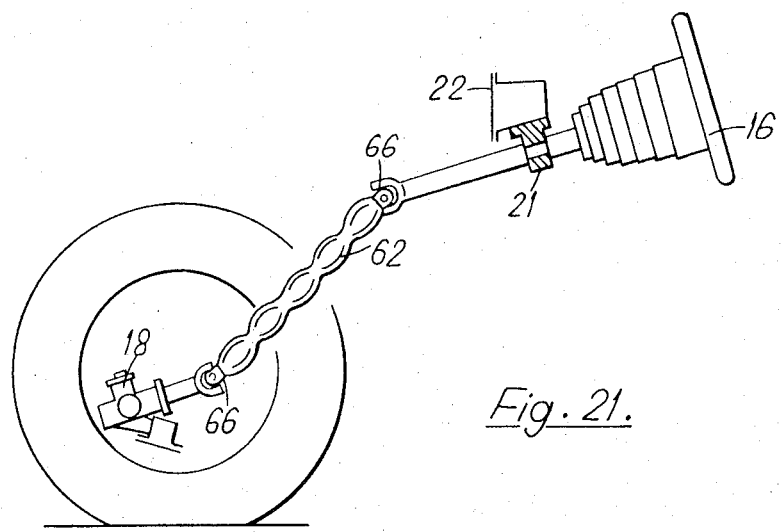
FIG. 21 is a view similar to FIG. 20 but showing a steering shaft interrupted by two universal joints.

FIG. 21 shows a steering shaft 62 which has two universal joints 66. Depressions providing preferential yield regions are formed over the entire length of a rectilinear tubular portion of the steering shaft between the joints 66. In the event of frontal impact of the vehicle, this tubular portion is thereby able to collapse without appreciable forces being exerted on the upper support bearing 21 for the steering shaft.

What is claimed is:

1. In a safety steering arrangement for a motor vehicle, having a steering shaft arranged to transmit steering effort and, on being subjected to a force corresponding to frontal impact of the vehicle, to deform permanently with absorption of energy, the improvement which comprises a series of depressions formed in a rectilinear portion of the steering shaft, with each depression providing local alteration of the cross-sectional shape of the rectilinear portion such that the depressions thereby provide a plurality of preferential yield regions for lateral buckling of the rectilinear portion of the steering shaft to occur at a predetermined critical loading.

2. In a safety steering arrangement for a motor vehicle, having a steering shaft arranged to transmit steering effort and, on being subjected to a force corresponding to frontal impact of the vehicle, to deform permanently with absorption of energy, the improvement which comprises a series of depressions forming longitudinally spaced flattened portions in the wall of a rectilinear tubular portion of the steering shaft, with each depression providing local alteration of the cross-sectional shape of the tubular portion such that the depressions thereby provide a plurality of preferential yield regions for lateral buckling of the tubular portion of the steering shaft to occur at a predetermined critical loading.

3. In a safety steering arrangement for a motor vehicle, having a steering shaft arranged to transmit steering effort and, on being subjected to a force corresponding to frontal impact of the vehicle, to deform permanently with absorption of energy, the improvement which comprises a plurality of longitudinally spaced depressions arranged in a circumferentially staggered configuration in the wall of a rectilinear tubular portion of the steering shaft that is initally of circular cross-section, with each depression providing local alteration of the cross-sectional shape of the tubular portion such that the depressions thereby provide a plurality of preferential yield regions permitting lateral buckling of the steering shaft to occur at a predetermined critical loading.

4. In a safety steering arrangement for a motor vehicle, having a steering shaft arranged to transmit steering effort and, on being subjected to a force corresponding to frontal impact of the vehicle, to deform permanently with absorption of energy, the improvement which comprises a plurality of diametrically opposite pairs of flattened portions longitudinally spaced along the wall of a rectilinear tubular portion of the steering shaft that is initially of circular cross-section, to provide generally oval local cross-sectional shapes for the tubular portion of the steering shaft, the major axes of the successive generally oval cross-sectional shapes being staggered by an angle of 90° in a circumferential sense, whereby the pairs of flattened portions provide a plurality of preferential yield regions permitting lateral buckling of the steering shaft to occur at a predetermined critical loading.

5. In a safety steering arrangement for a motor vehicle, having a steering shaft arranged to transmit steering effort and, on being subjected to a force corresponding to frontal impact of the vehicle, to deform permanently with absorption of energy, the improvement which comprises a plurality of longitudinally spaced diametrically opposite pairs of flattened portions formed in the wall of a rectilinear tubular portion of the steering shaft initially of circular cross-section, such that opposite regions of the wall of the tubular portion are in contact with one another, with successive pairs of flattened portions staggered by an angle of 90° in a circumferential sense, whereby the pairs of flattened portions provide a plurality of preferential yield regions permitting lateral buckling of the steering shaft to occur at a predetermined critical loading.

6. In a safety steering arrangement for a motor vehicle, having a steering shaft arranged to transmit steering effort and, on being subjected to a force corresponding to frontal impact of the vehicle, to deform permanently with absorption of energy, the improvement which comprises a plurality of longitudinally spaced diametrically opposite pairs of flattened portions formed in the wall of a rectilinear tubular portion of the steering shaft initially of circular cross-section, with opposite regions of the wall of the tubular portion in contact with one another and held together by welding, successive pairs of flattened portions being angularly staggered in a circumferential sense, whereby the pairs of flattened portions provide a plurality of preferential yield regions permitting lateral buckling of the steering shaft to occur at a predetermined critical loading.

7. In a safety steering arrangement for a motor vehicle, having a steering shaft arranged to transmit steering effort and, on being subjected to a force corresponding to frontal impact of the vehicle, to deform permanently with absorption of energy, the improvement which comprises a plurality of longitudinally spaced unilaterally flattened portions of D-shaped cross-section in the wall of a rectilinear tubular portion of the steering shaft initially of circular cross-section, with successive unilaterally flattened portions being circumferentially staggered by an angle of 90°, the D-section flattened portions of the rectilinear tubular portion of the steering shaft thereby providing respective preferential yield regions for lateral buckling of the steering shaft at a predetermined critical loading.

8. In a safety steering arrangement for a motor vehicle, having a steering shaft arranged to transmit steering effort and, on being subjected to a force corresponding to frontal impact of the vehicle, to deform permanently with absorption of energy, the improvement which comprises a plurality of longitudinally spaced unilaterally flattened portions of D-shaped cross-section in the wall of a rectilinear tubular portion of the steering shaft initially of circular cross-section, with successive unilaterally flattened portions being circumferentially staggered by an angle of 120°, the D-section flattened portions of the steering shaft thereby providing respective preferential yield regions for lateral buckling of the steering shaft at a predetermined critical loading.

9. In a safety steering arrangement for a motor vehicle, having a steering shaft arranged to transmit steering effort and, on being subjected to a force corresponding to deform impact of the vehicle, to eform permanently with absorption of energy, the improvement which comprises a continuous helically extending indentation in the wall of a rectilinear tubular portion of the steering shaft initially of circular cross-section, thereby to provide progressive local alteration of the cross-sectional shape of the tubular portion in a manner providing a plurality of preferential yield regions for lateral buckling of the tubular portion of the steering shaft to occur at a predetermined critical loading.

* * * * *

PO-1050
(5/69)

UNITED STATES PATENT OFFICE
CERTIFICATE OF CORRECTION

Patent No. __3,813,961__ Dated __June 4, 1974__

Inventor(s) __Karl Hug__

It is certified that error appears in the above-identified patent and that said Letters Patent are hereby corrected as shown below:

Column 8, lines 38 and 39 (application page 22, lines 5 and 6),

"corresponding to deform impact of the vehicle, to eform"

should read

--corresponding to frontal impact of the vehicle, to deform--.

Signed and sealed this 5th day of November 1974.

(SEAL)
Attest:

McCOY M. GIBSON JR.
Attesting Officer

C. MARSHALL DANN
Commissioner of